United States Patent
Clemons

(10) Patent No.: US 8,029,836 B2
(45) Date of Patent: Oct. 4, 2011

(54) NON-PERISHABLE PLANT-DERIVED DECORATIVE ITEMS AND METHODS FOR MAKING SAME

(75) Inventor: John C. Clemons, Encinitas, CA (US)

(73) Assignee: Sweetfields, Inc., Jamul, CA (US)

( * ) Notice: Subject to any disclaimer, the term of this patent is extended or adjusted under 35 U.S.C. 154(b) by 1180 days.

(21) Appl. No.: 11/347,475

(22) Filed: Feb. 3, 2006

(65) Prior Publication Data

US 2006/0172042 A1    Aug. 3, 2006

Related U.S. Application Data

(60) Provisional application No. 60/649,786, filed on Feb. 3, 2005, provisional application No. 60/761,085, filed on Jan. 22, 2006.

(51) Int. Cl.
*A23L 1/00*    (2006.01)
(52) U.S. Cl. ........................................ 426/102; 426/103
(58) Field of Classification Search .................. 426/102, 426/103
See application file for complete search history.

(56) References Cited

U.S. PATENT DOCUMENTS

| | | | |
|---|---|---|---|
| 2,524,333 A | * | 10/1950 | Snelling ........................ 426/568 |
| 4,117,173 A | | 9/1978 | Schiweck et al. |
| 4,980,189 A | | 12/1990 | Keme et al. |
| 5,314,701 A | | 5/1994 | Mentink et al. |

FOREIGN PATENT DOCUMENTS

| | | | |
|---|---|---|---|
| FR | 2769472 A1 | | 4/1999 |
| JP | 2003023961 A | * | 1/2003 |
| WO | WO 0167882 A1 | * | 9/2001 |

OTHER PUBLICATIONS

Southern Living, "Candied Flowers and Raspberries", Jun. 1998 (obtained from http://find.myrecipes.com/recipes/recipefinder.dyn?action=displayRecipe&recipe_id=522557), 3 pages.*
http://www.preparedpantry.com/meringue-powder-royal-icing-frosting.aspx, Meringue Powder for icing, print date Aug. 16, 2009, pp. 3.*
http://dictionary.reference.com/browse/kit definition , Aug. 17, 2009, 2 pages.*
Smith et al., "GRAS Flavoring Substances 22", Food Technology 59(8):24-63 (2005).

* cited by examiner

*Primary Examiner* — Jyoti Chawla
(74) *Attorney, Agent, or Firm* — Acuity Law Group; Daniel M. Chambers

(57) ABSTRACT

Non-perishable plant-derived decorative food items are described, as are methods for making such articles.

10 Claims, 17 Drawing Sheets

NON-PERISHABLE PLANT-DERIVED DECORATIVE ITEMS AND METHODS FOR MAKING SAME

RELATED APPLICATIONS

This application claims the benefit of and priority to U.S. provisional patent application Ser. No. 60/649,786, filed 3 Feb. 2005, entitled "Non-Perishable Candied Plant-Derived Food Items and For Making," U.S. provisional patent application Ser. No. 60/761,085, filed 22 Jan. 2006, entitled "Non-Perishable Plant-Derived Decorative Items and For Making Same," and a PCT application filed on an even date herewith PCT/US06/03800, entitled "Non-Perishable Plant-Derived Decorative Items and For Making Same," which applications are each incorporated herein in its entirety for all purposes.

TECHNICAL FIELD OF THE INVENTION

The present invention relates in general to candied, non-perishable plant-derived decorative food items, and methods for making such articles.

BACKGROUND OF THE INVENTION

1. Introduction

The following section includes information that may be useful in understanding the present invention. It is not an admission that any such information is prior art, or relevant, to the presently claimed inventions, or that any publication specifically or implicitly referenced is prior art.

2. Background

Edible flowers have been used in the culinary arts for flavor and garnish for hundreds of years. Early reports indicate that the Romans used flowers in cooking, as did the Chinese, Middle Eastern, and Indian cultures. In fact, the first mention of people consuming flowers dates back at least as far as 140 BCE.

Candied fruits have typically been being made the same way since the at least the 14$^{th}$ century. In that process, barely ripe fruit is placed in increasingly stronger solutions of heated sugar syrup, with the syrup gradually replacing the water content of the fruit. The process can take from several days to several months, depending upon the type and size of fruit.

Candied or crystallized flowers have also been know for hundreds of years, and are generally prepared using a procedure that involves dipping or coating a flower with beaten egg white, followed by dipping and rolling the flower in sugar, and then sprinkling the upper surface of the flower with sugar as well. That process frequently results in a clumpy, uneven, and heavily coated flower having most its natural color and beauty obscured. Also, because that technique uses raw egg whites, problems such as spoilage, contamination with undesired microorganisms (e.g., *Salmonella* species), or allergic reactions, can result.

To address some of these problems, one improvement has been to use pasteurized powdered egg whites instead of fresh egg whites. Another improvement involves the sprinkling of sugar instead of dipping. Indeed, today these methods are how most crystallized flowers and/or edible produce are made.

These techniques, while improvements over the way plant material was candied or crystallized for centuries, still have inherent problems. Once such problem is that the plant material may dry non-uniformly, resulting in a product that is misshapen, deformed, or off-color when compared to the original, fresh counterpart. Another problem is that once dry, these products tend to be fragile and can also rapidly spoil should any of the plant surfaces remain uncoated, and even when coated, such products can readily absorb moisture, leading to their decay. Therefore there remains an unfulfilled need for processes and components that eliminate the difficulties and guesswork associated with making non-perishable plant-derived candied food items that resemble their fresh counterparts.

3. Definitions

Before describing the instant invention in detail, several terms used in the context of the present invention will be defined. In addition to these terms, others are defined elsewhere in the specification, as necessary. Unless otherwise expressly defined herein, terms of art used in this specification will have their art-recognized meanings.

An "aqueous solution" refers to a water-based solution capable of dissolving or dispersing one or more other substances, or solutes (i.e., the substance(s) dissolved in the solvent). A "solution" is a homogeneous mixture of at least one substance in a liquid. In the context of this invention, "aqueous solvents" can also include other liquids, including organic liquids, such as alcohols and/or oils.

A "binding agent" refers to an ingredient or substance, or mixture of ingredient or substances (i.e., a "composition"), which binds ingredients together. Examples include substances such as proteins. In the context of the invention, a particularly preferred protein is egg white protein, or albumen or ovalbumin.

An "edible" item refers to a product or composition in any physical form that is intended to be consumed by a human or other animal in whole or part via the oral cavity. Therefore, each ingredient or additive used in food preparation, whether naturally occurring as a product of nature or synthetically produced, or that becomes a part of or is used to treat an edible composition, is to be regarded as being edible. A "non-edible" item refers to a product or composition in any physical form that is not intended to be consumed by a human or other animal in whole or part via the oral cavity.

The term "egg white" refers to any egg white composition suitable for use as a binding agent in a preservative composition in accordance with the invention. In general, egg whites are the nutritive, protective gelatinous mixture surrounding the egg yolk, and are comprised primarily of albumen dissolved in water. Egg whites, including egg white protein, and other proteinaceous binding agents, may be derived from any suitable source. In the case of egg whites, they are typically, although not necessarily, harvested from poultry (frequently, chicken) eggs.

The term "food item" refers to any product or composition known to have or disclosed as having a nutritional effect. Items historically regarded as food include various meats (e.g., beef, pork, poultry, fish, etc.), dairy products (e.g., milk, cheese, eggs), fruits, vegetables, cereals, breads, etc.

A "fresh" food item is one that is not preserved, for example, by canning, dehydration, freezing, or smoking.

A "patentable" composition, process, machine, or article of manufacture according to the invention means that the subject matter at issue satisfies all statutory requirements for patentability at the time the analysis is performed. For example, with regard to novelty, non-obviousness, or the like, if later investigation reveals that one or more claims encompass one or more embodiments that would negate novelty, non-obviousness, etc., the claim(s), being limited by definition to "patentable" embodiments, specifically excludes the unpatentable embodiment(s). Also, the claims appended hereto are to be interpreted both to provide the broadest reasonable scope, as well as to preserve their validity. Furthermore, if one or more of the statutory requirements for patentability are amended or if the standards change for assessing whether a particular statutory requirement for patentability is satisfied from the time this application is filed or issues as a patent to a time the validity of one or more of the appended claims is questioned, the claims are to be interpreted in a way that (1) preserves their validity and (2) provides the broadest reasonable interpretation under the circumstances.

The term "plant-derived" means that the item is derived, or comes from, from a plant, and thus refers to such things as flowers (with or without stems), flower petals, leaves, fruits, stems, stalks, etc.

A "sugar" refers to a class of carbohydrates soluble in water and dilute alcohol that are used as sweeteners and preservatives. In dry form, they are frequently crystalline. Disaccharides include sucrose, lactose, and maltose. Monosaccharides include glucose, fructose, and inositol. Other representative sugars include dextran, fruitose, invert sugar, lactitol, lactose, maltitol, maltodextrin, maltose, mannitol, sorbitol, sucrose, trehalose, isomalt, xylitol, polydextrose, and combinations thereof. Confectioner's sugar refers to a composition comprising 95-97% sucrose ground together with cornstarch to a fine powder. "Granulated" or "table" sugar refers to sucrose granulated into a fine white powder. Suitable sugars also include natural and raw sugars, including sugars that are brown or white when refined into crystalline form. Sugars may also be used in liquid form; for example, molasses may be employed in the practice of the methods of this invention, as may other sugar-containing solutions produced naturally or by a suitable refining process.

In a "suspension" solid particles are dispersed in a liquid. The term "colloidal" refers to a state of subdivision, which, in the context of solutions, means that molecules or particles dispersed in the liquid have at least in one direction a dimension roughly between 1 nm and 1 μm. It is not necessary for all three dimensions to be in the colloidal range. A "colloidal dispersion" is a system in which particles of colloidal size of any nature (e.g. solid, liquid or gas) are dispersed in a continuous phase of a different composition (or state). In an "emulsion" liquid droplets and/or liquid crystals are dispersed in a liquid. An emulsion may be denoted by the symbol "O/W" if the continuous phase (i.e., is an aqueous solution) and by "W/O" if the continuous phase is an organic liquid.

SUMMARY OF THE INVENTION

The present invention advances the art of making non-perishable, plant-derived food items, be they edible or non-edible, by providing processes and compositions useful for such purposes. These processes and compositions result in patentable edible or non-edible non-perishable, plant-derived food items that have improved durability, appearance, scent, and flavor, as compared to currently available candied or crystallized flowers. Moreover, the processes and compositions described herein result in finishes products that more closely resemble fresh, untreated produce than do products produced using conventional recipes and techniques. The instant invention also allows for the production of non-perishable, plant-derived food items, e.g., non-perishable, edible flowers, that are visually enhanced by the addition of one or more types of edible or non-edible decorative components, such as additional coloration, reflective elements, finishes that have differing amounts of sheen, and the like.

The present invention also furthers the art of making candied or crystallized plant material by introducing scalable processes that allow large-scale production of the non-perishable plant-derived food items of the invention. Such processes also allow additional flavors, scents, colors, textures, and even decorative components (e.g., precious or semi-precious stones and/or metals) to be added in the course of producing a food item according to the invention.

It is thus an object of the invention to provide methods to produce non-perishable, plant-derived food items that have improved durability, appearance, scent, flavor, and/or and visual esthetics as compared to a food item of the same type produced by conventional techniques.

Another related object concerns the non-perishable, plant-derived food items themselves, which, for purposes of the claims appended hereto that concern such articles, will be understood to refer to patentable non-perishable, plant-derived food items. Such food items, for examples flowers, exhibit improved durability, appearance, scent, flavor, and/or visual esthetics, as compared to candied or crystallized flowers and food items produced by conventional techniques.

Additional objects and advantages of the present invention will become apparent from further description of the invention.

The objects and advantages of this invention are achieved, through the use of patentable processes for producing decorative non-perishable plant-derived materials, particular food items. Such processes include treating a plant-derived food item (also referred to as edible plant material, or plant material), preferably is preferably fresh, with a preservative composition. Such a preservative composition (i.e., a "preservative") is usually a solution or suspension that comprises a solvent that includes, water, alcohol, and a binding agent, for example, egg white protein. After treatment with the preservative composition, a strengthening component is added to the at least the preservative-coated lower surface of the plant-derived food item. Preferably, the strengthening component is added before the preservative composition has completely dried; in other words, the preservative composition is still liquid. A sugar coating (e.g., a confectionary glaze) is then added to at least the upper surface of the food item, after which the food item is dried. If desired, additional components can be added to the plant-derived food item during such a process, including flavoring and/or scenting agents. Decorative components can also be added, preferably prior to application of the sugar coating.

As the foregoing makes clear, this invention concerns patentable methods for producing patentable non-perishable plant-derived food items, including flowers, flower petals, leaves, fruits, vegetables, stems, and roots, which food items in any event each have upper and lower surfaces. The methods of the invention involve coating a fresh plant-derived food item with a preservative composition, which, for example, can be prepared as an aqueous solvent that includes water and alcohol and which includes a binding agent, such as egg whites. Particularly preferred egg white-containing compositions are those that comprise meringue. For instance, a representative meringue composition includes powdered egg whites, cornstarch, vanilla, sugar, calcium sulfate, citric acid, cream of tartar, gum arabic, and silicon dioxide.

With regard to alcohol content, preferably, the preservative composition contains from about 0.01% to at least about 50% alcohol on a volumetric basis, and contains even more preferably at least about 1% to about 50% alcohol. The alcohol is preferably a distilled spirit, particularly when the finished article is intended for human consumption. Especially preferred alcohol and spirits include beer, wine, champagne, vodka, gin, scotch, whiskey, bourbon, cognac, brandy, rum, and grain alcohol.

Optionally, a strengthening component can then be applied to at least the preservative-coated lower surface of the food item, preferably while the preservative remains liquid. A preferred example of a strengthening component is a sugar, which may be delivered in solid form or be dissolved in a solution, preferably an aqueous solution. Preferred aqueous sugar-containing solutions may contain up to about 60% or more sugar (measured by weight per volume), such as sucrose. For example, a 40% w/v solution of sucrose in water refers to one in which 400 grams of sucrose is dissolved in water added to make one liter. The strengthening component, or a composition containing it, may be applied before or after the initial preservative coating has dried.

A sugar coating is next applied to at least the upper surface of the food item, after which the food item is dried, yielding a non-perishable plant-derived food item. Preferably, the sugar coating is applied as a sugar-containing aqueous solution. Preferred sugars used to prepare the composition applied to form the sugar coating include any non-toxic edible sugar, such as powdered sugar, confectionary sugar, granulated sugar, raw sugar, or derivative thereof, as well as any combination of any of these forms of sugar, alone or with other sugars.

Any suitable coating process may be used to deliver any of various the coatings applied in the course of practicing this aspect of the invention, including application of the preservative composition, application of the strengthening component, application of a sugar coating, and/or application of any additional coating(s) (e.g., a specialty coating). Preferred coating processes include immersion, spraying, painting, and any combination of any of these processes, alone or with other coating processes adapted for practicing the methods of this invention. If desired, some portion of any of the various coatings applied during the practice of the invention can be removed, it being understood that such removed portion of a coating is an "excess" of such coating. For instance, in some embodiments, excess preservative composition is removed from the preservative-coated surface(s) prior to applying the strengthening component. Any suitable method can be employed in removing an excess of any coating. Preferred removal methods include blotting, shaking, and centrifugation, particularly low speed centrifugation.

In some preferred embodiments of the invention, a surface of the plant-derived food item, particularly the upper surface, is embellished with one more decorative items or features. This may occur, for example, by adding visible sugar granules to at least the upper surface of the food item after applying the sugar coating, thus forming a specialty coating in which at least a portion of the added sugar granules remains visible after drying the food item. In some preferred embodiments of this sort, the visible sugar granules are applied substantially uniformly to a surface, whereas in other embodiments, the granules (or other embellishing items) are applied randomly. Thus, as those in the art will appreciate, any desired embellishment may be applied, and may be accomplished by applying any suitable decorative component or items, or combination thereof. Indeed, other embellishment may also be accomplished, alone or in addition to adding one or more decorative components. For example, various flavorings, scents, dyes, other foods (e.g., chocolate or other forms of cocoa enhancement), may also be added. Preferred flavorings include various flavoring composition that comprises a plant-derived oil, such as a berry oil, a citrus oil, a prunus oil, or a melon oil. If desired, embellishments may also, or alternatively, be added after the sugar coating has substantially dried. Decorative items for this purpose include gems and gem fragments, minerals, metals, paints and/or iridescent colorings, food colorings, food dyes, non-food dyes, forms of chocolate or cocoa, and any desired combinations of these and other adornments.

If desired, the decorative component(s) can be applied, or if already applied, secured, to the plant-derived food item using any suitable confectionery coating, preferred examples of which include food grade confectionery lacquers, confectionary shellac, and other confectionery glazes. Particularly preferred confectionery coatings include confectionary shellacs and solutions that contain an isomalt sugar. As will be appreciated, such a final coating, or series of final coatings applied serially, may also serve as another, or second, preservative coating. Indeed, confectionery coatings such as those containing food-grade shellac can serve as effective moisture barriers. These and other final coatings applied in the course of preparing a non-perishable plant-derived food item according to the invention may be referred to herein as "specialty coatings". Typically, such a coating is also a sugar-based coating, applied usually as a sugar-containing aqueous solution.

In addition to patentable methods, the invention also concerns non-perishable, plant-derived food items prepared using such methods. Such articles comprise a plant-derived food item coated with a preservative composition comprised of a binding agent, preferably egg white protein. Optionally, and in preferred embodiments, a strengthening component is also applied to at least a portion of the food item, particularly to its lower surface. This is particularly so in the case of a fragile plant-derived food items such as flowers, as petals may wilt or droop or otherwise be difficult to maintain in a desired position over time. A sugar coating is also included. In many embodiments, the sugar coating serves to provide a hard, candied appearance. In preferred embodiments, at least one other coating is applied on top of the sugar coating. Preferred examples of such additional coatings include food-grade preservative coatings and/or other specialty coatings. The food articles may also include one or more added flavorings and/or scents, which, if included, are typically included in one of the compositions used to apply one of the coatings to the article during processing. The non-perishable, plant-derived food items of the invention may also be adorned with any desired decorative components to further enhance their appearance. After processing, such food items are preferably packaged, individually or in number, into a suitable container for storage and shipment.

These and other aspects and embodiments are further described below.

BRIEF DESCRIPTION OF THE DRAWINGS

In FIG. 1, a solid line also closely parallels the border of the petals, demarcating the actual boundary of the petal edge. In this figure and in several of the other figures among FIGS. 2-18, the pairs of diagonal, parallel, staggered lines indicate that the upper surface of the flower petals has a high sheen, whereas the small dots spread across the petals' upper surface represent small, visible crystalline material (e.g., visible sugar crystals) embedded in one of the coatings beneath the final outer coating applied to the flower. As will be appreciated, the inclusion of visible crystalline material is optional, as is a high sheen finish.

FIG. 15 is a perspective view a non-perishable flower, much like the one represented in FIG. 12, the difference being that in this figure, the flower shown contains a gold-colored band (as may be applied by using a gold-colored, or metallic gold-containing paint) (hatched area) around the outer edge of each petal

FIG. 18—Perspective view with finish & small silver band

Figure 1:
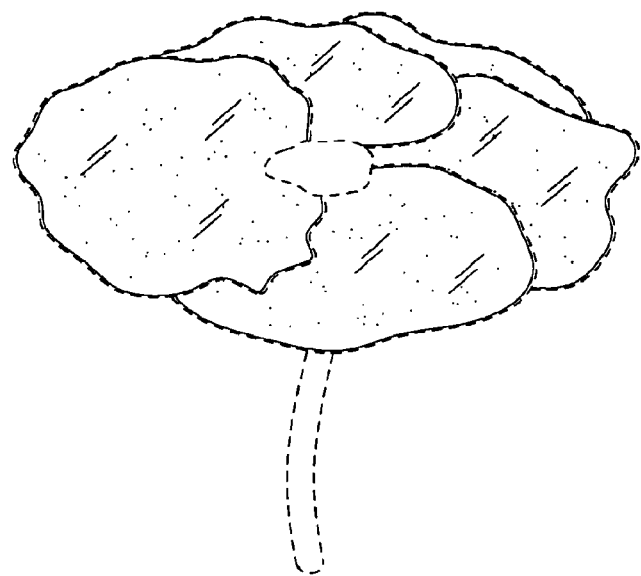
FIG. 1 is a perspective view of a generically represented non-perishable flower produced using a method according to the invention. In this figure, as well as in FIGS. 2-18, the generic nature of the flower, and its petals and petal number, is indicated by way of hatched lines that define the borders of the various flower parts and stem, if shown.
Figure 2:
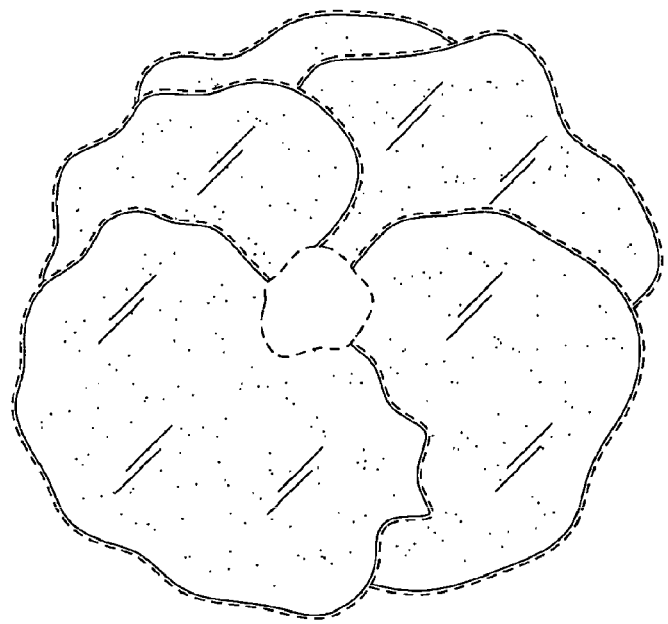
FIG. 2 is a top view of the non-perishable flower shown in FIG. 1.
Figure 3:
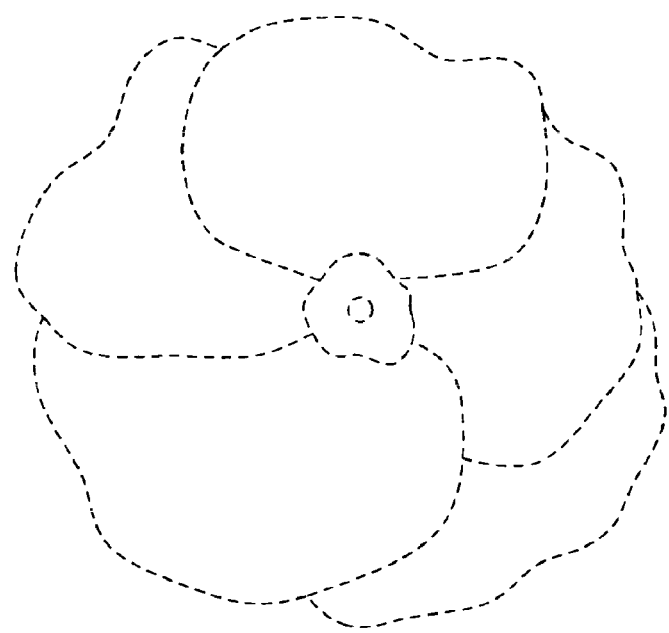
FIG. 3 is a bottom view of a non-perishable flower prepared in accordance with this invention. Again, the border of the flower and some of its constituent parts visible from below (e.g., petals and sepals), as well as the stem, are hatched to indicate their generic nature, as opposed to representing a particular flower.
Figure 4:
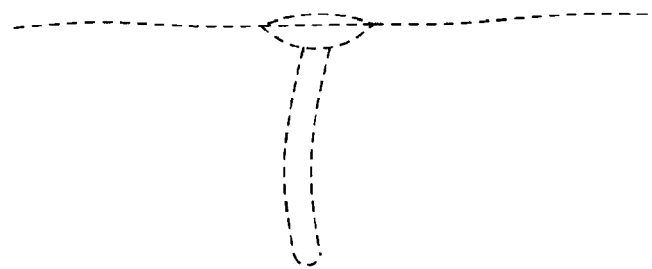
FIG. 4 is a front view the non-perishable flower representation shown in FIG. 1.
Figure 5:
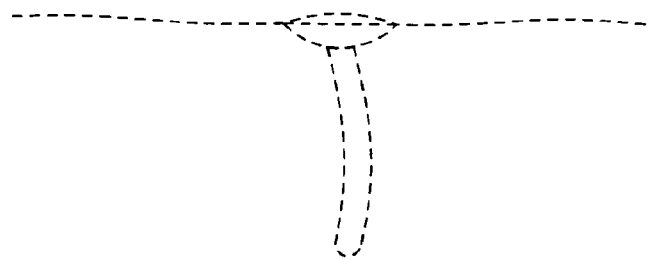
FIG. 5 is a rear view the non-perishable flower representation shown in FIG. 1.
Figure 6:
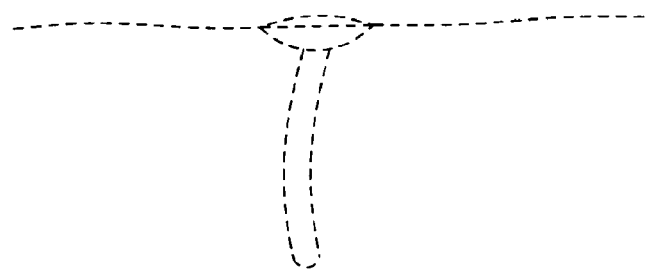
FIG. 6 is a left view the non-perishable flower representation shown in FIG. 1.
Figure 7:
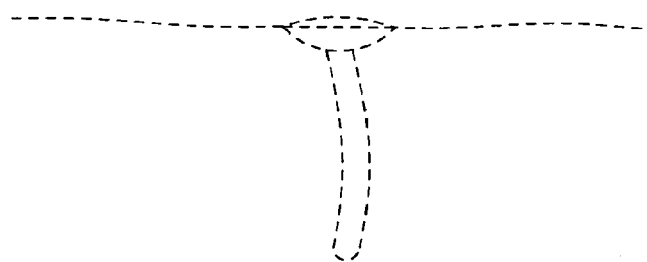
FIG. 7 is a right view the non-perishable flower representation shown in FIG. 1.
Figure 8:
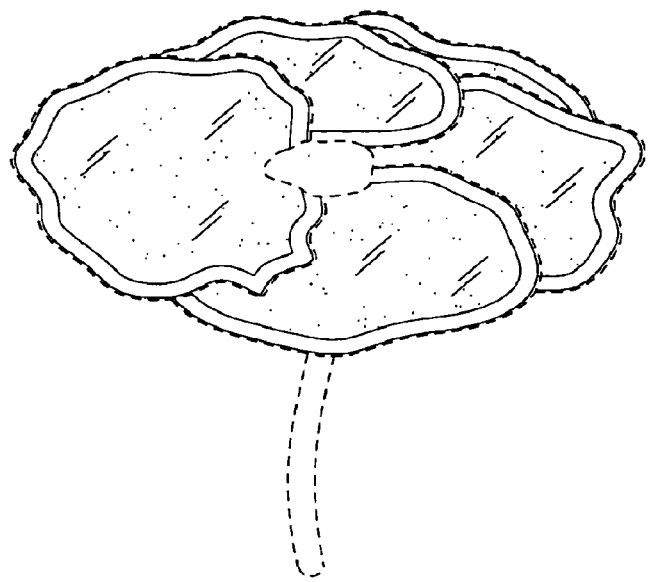
FIG. 8 is a perspective view a non-perishable flower, much like the one represented in FIG. 1, the difference being that in this figure, the flower shown also contains a colored band (color not indicated) around the outer edge of each petal. The colored bands are represented by the area between the solid lines illustrated at and near the outer edge of each petal.
Figure 9:
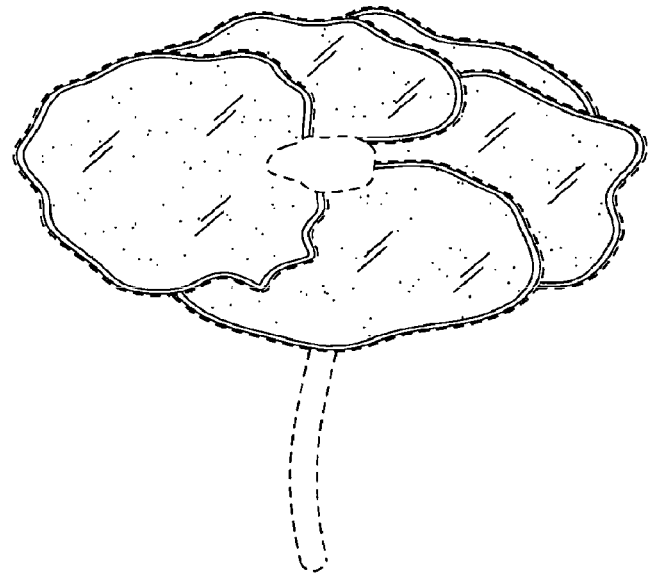
FIG. 9 is a perspective view a non-perishable flower, much like the one represented in FIG. 8, the difference being that in this figure, the flower shown contains a narrower colored band (color not indicated) around the outer edge of each petal than the bands represented in FIG. 8. This colored band is represented by the area between the solid lines illustrated at and near the outer edge of each petal. Such bands may be applied by any suitable method, including painting.
Figure 10:
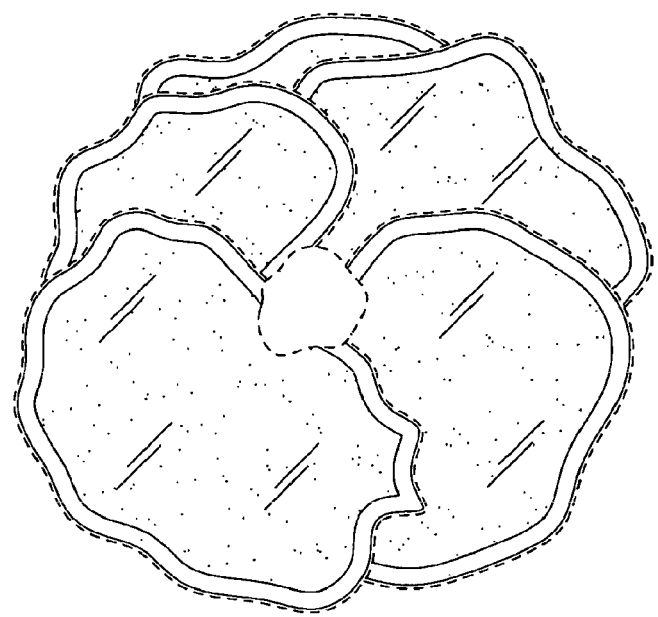
FIGS. 10 and 11 show a top view of the non-perishable flowers represented FIGS. 8 and 9, respectively.
Figure 11:
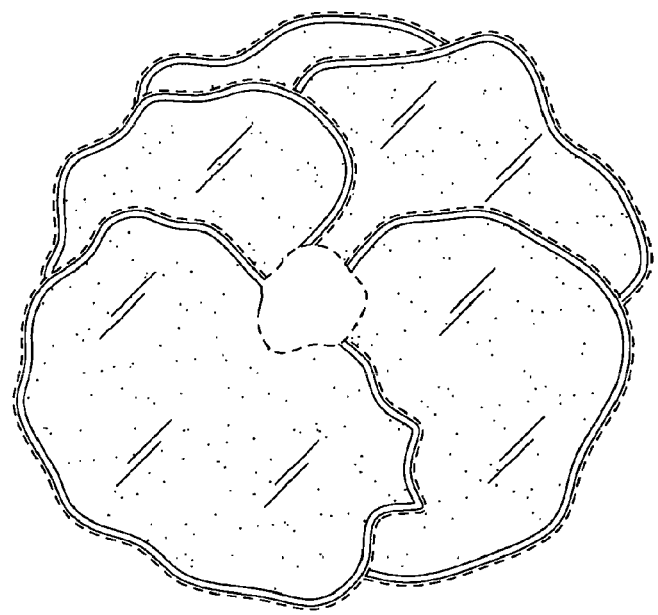
Figure 12:
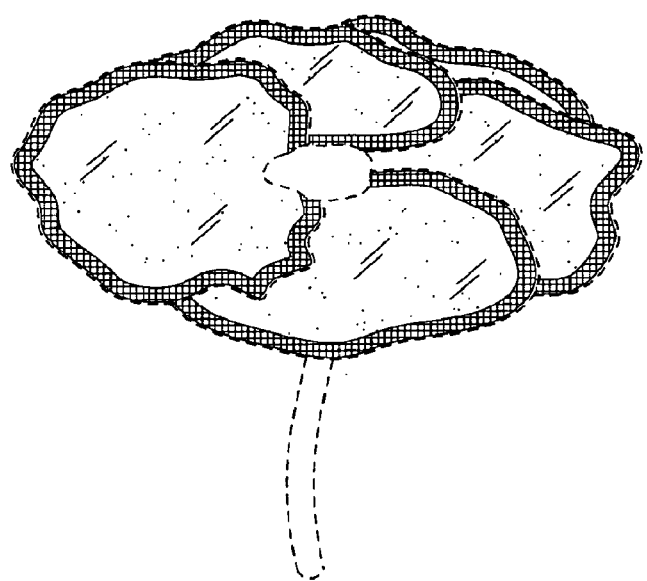
FIG. 12 is a perspective view a non-perishable flower, much like the one represented in FIG. 8, the difference being that in this figure, the flower shown also contains a silver-colored band (as may be applied by using a silver-colored, or metallic silver-containing paint) (cross-hatched area) around the outer edge of each petal.
Figure 13:
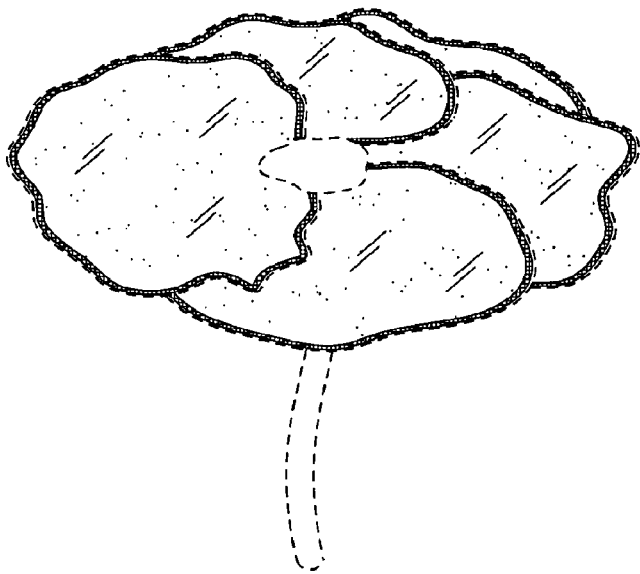
FIG. 13 is a perspective view a non-perishable flower, much like the one represented in FIG. 12, the difference being that in this figure, the flower shown contains a narrower silver-colored band (around the outer edge of each petal than the silver bands represented in FIG. 12.
Figure 14:
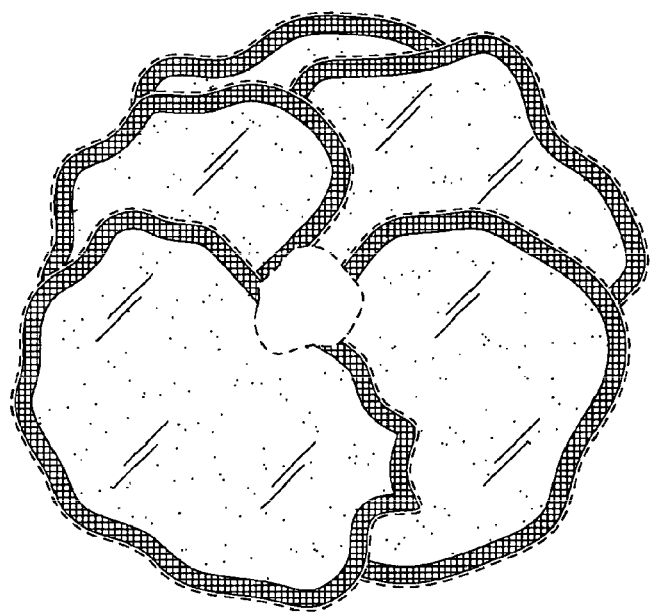
FIGS. 14 and 15 show a top view of the non-perishable flowers represented FIGS. 12 and 13, respectively.
Figure 15:
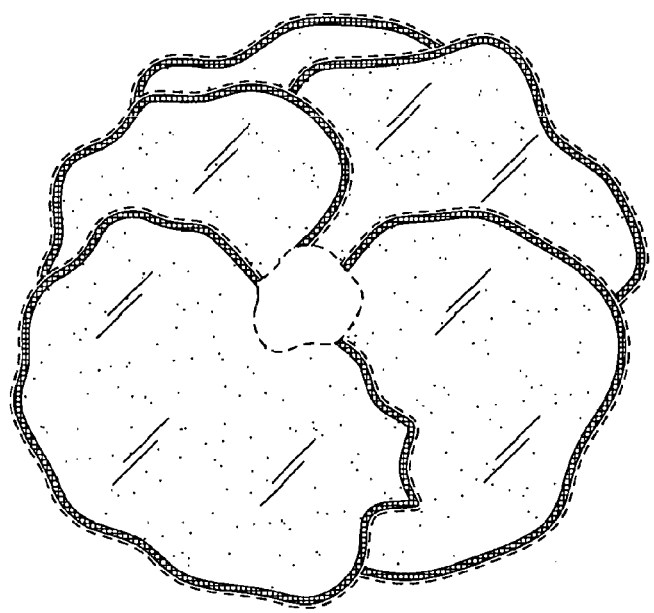
Figure 16:
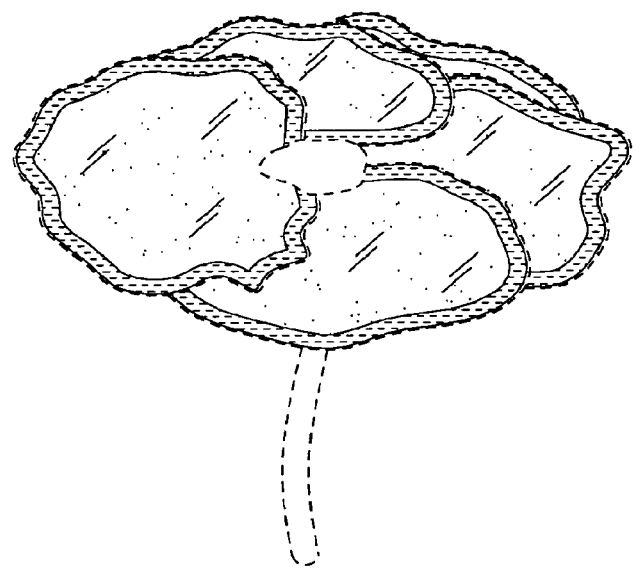
FIG. 16 is a perspective view a non-perishable flower, much like the one represented in FIG. 15, the difference being that in this figure, the flower shown contains a narrower gold-colored band around the outer edge of each petal than the gold bands represented in FIG. 15.
Figure 17:
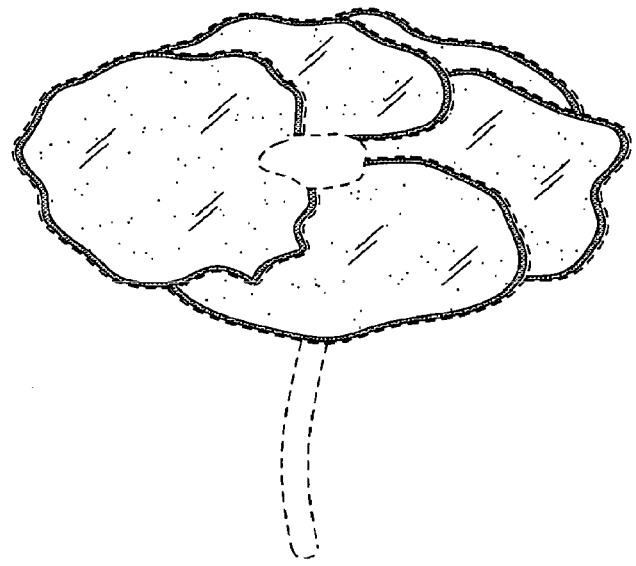
FIGS. 17 and 18 show a top view of the non-perishable flowers represented FIGS. 15 and 16, respectively.
Figure 18:
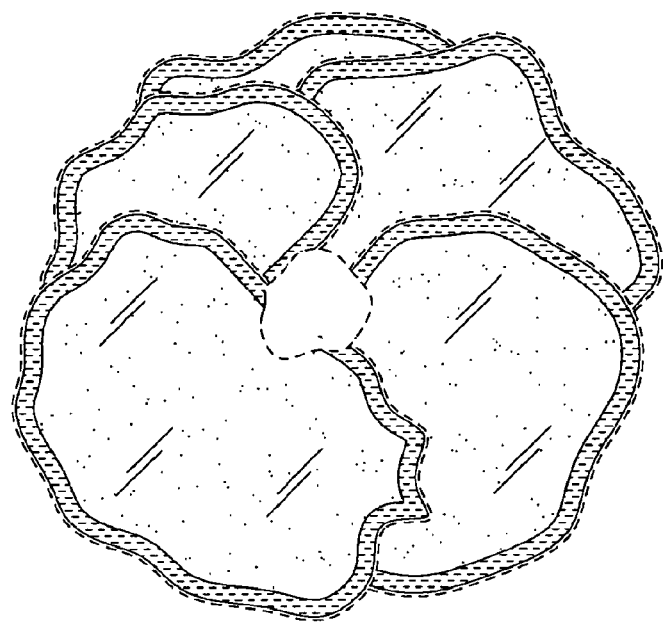
Figure 19:
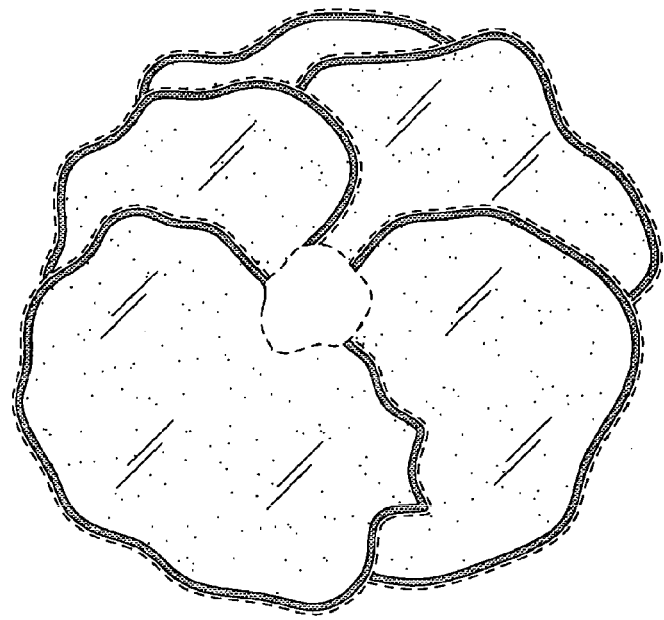

As those in the art will appreciate, the following description describes certain preferred embodiments of the invention in detail, and is thus only representative and does not depict the actual scope of the invention. Before describing the present invention in detail, it is understood that the invention is not limited to the particular processes, compositions, formulations, and food items described, as these may vary. It is also to be understood that the terminology used herein is for the purpose of describing particular embodiments only, and is not intended to limit the scope of the invention defined by the appended claims.

DETAILED DESCRIPTION

The following detailed description of the embodiments of the present invention, is not intended to limit the scope of the invention, as claimed, but is merely representative of the presently preferred embodiments of the invention.

As described above, this invention concerns patentable non-perishable, plant-derived food items, and patentable methods and processes for making such food items. Turning first to the inventive methods and processes, these begin by obtaining one or more plant-derived food items to be processed in accordance with the processes of the invention. Preferably, the plant material is fresh, meaning that it is still respiring at the time the preservative composition is applied. This is not to say that treatments such as the use of mild acid or chlorine washes, applications of post-harvest pesticides, low level irradiation, can not be used prior to processing the plant material, provided that after such pre-treatments the material continues to respire. Less preferable are plant-derived food items that have been processed, for example, by freezing or canning, prior to treatment with a method according to the invention, although it will be understood that fresh produce that has been flash-frozen and stored before processing as described herein is only slightly less preferred than fresh plant-derived food items. If a frozen plant-derived food item is used, it should be thawed prior to processing according to the invention. Thus, in preferred embodiments, the plant-derived material used in a process of the invention is fresh, and even more preferably, edible. Particularly preferred edible plant materials include flowers, flower petals, leaves, fruit, roots, stems, vegetables, and the like, alone or in combination with other products, and including combinations of any two or more edible plant materials. Also, when a finished food item according to the invention is intended to be edible, the various components used in processing the plant-derived food item, or their residues, are also edible.

In preferred embodiments of the invention, the preservative composition or formulation, made either with or without scenting and/or flavoring agents, comprises egg white protein dissolved in a solution containing water and alcohol. Here, the term "alcohol" refers to a class of organic chemicals that are liquids at room temperature and are formed from a hydrocarbon by substitution of a of one or more hydroxyl groups for an equal number of hydrogen atoms. A particularly preferred alcohol for use in the practice of the methods of this invention is ethanol (i.e., ethyl alcohol), particularly ethanol as found in distilled spirits, i.e., any of a variety of alcoholic beverages that contain more than about 15% ethanol and are obtained by the distillation of fermented agricultural products, including spirits of wine, whiskey (e.g., whisky, grain alcohol, bourbon, scotch), rum, brandy (e.g., cognac), gin, vodka, and all dilutions and mixtures thereof, as well as in fermented alcoholic beverages such as beer (e.g., any alcoholic beverage made by fermenting a cereal (or mixture of cereals) flavored with hops), and wine and champagne (i.e., any alcoholic beverage resulting from the fermentation of grapes or grape juice). Preferably, the alcohol(s) (or their residues) used in practicing the invention are safe for human consumption. As will be appreciated, depending upon context, "alcohol" may refer to an organic chemical such as ethanol in pure form, or it may refer to the alcohol component of a more complex solution, such as a distilled spirit, beer, or wine.

Typically, the preservative composition is a liquid formulation, preferably a water-based solution. In certain preferred embodiments, the egg white portion of the preservative composition is supplied in the form of a meringue composition. In general, "meringue" refers to a mixture of egg whites, with added sugar (e.g., granulated sugar) or sugar syrup. A particularly preferred meringue composition for this purpose comprises powdered egg whites, cornstarch, vanilla, sugar, calcium sulfate, citric acid, cream of tartar, gum arabic, and silicon dioxide. Similarly, in some particularly preferred embodiments, the alcohol component of the preservative composition is provided as a distilled spirit suitable for human consumption (e.g., vodka, gin, scotch, whiskey, bourbon, cognac, brandy, rum, grain alcohol, and the like) or from beer or wine.

While not wishing to be bound to any particular theory, the preservative composition is believed to have a role in removing existing plant oils from the plant material, as well as removing and/or replacing water in the plant-derived material. Given this, the invention also envisions the use of other processes suited to accomplish these same ends. For example, the plant-derived material may be soaked in one or more solutions designed to draw oils from plant tissue while maintaining the integrity and appearance of the material. Techniques designed to displace water in plant material may also be used. These alternative techniques and compositions are known in the art, and will vary depending upon intended application. For example, when a finished plant material is intended to be non-edible, the chemicals used to displace water molecules in the plant tissue need not be edible.

As will be appreciated, a preservative composition also acts to coat the upper and lower surfaces of the plant-derived material with the preservative composition. An "upper surface" refers to a surface of a plant-derived material that, after processing in accordance with the invention, is designed to be the surface viewed by an end user, whereas a "lower surface", or "underside", refers to the surface of the material opposite the upper surface. In the context of flowers, and flower petals and the like, an "upper surface" typically thus refers to the surface opposite that to which the stem attaches. Similarly, the "upper surface" of a leaf is likely to be the surface that lacks stomata, and which is exposed to sunlight when attached to a plant.

Such preservative compositions, or coatings, preferably are transparent or clear upon drying so that the plant-derived material to which it was applied retains substantially the same appearance as before treatment with the preservative composition. Moreover, in those embodiments where flavoring and/or scenting agents are to be used, it is preferred that they be included in the preservative composition, although they may alternatively, or additionally, be applied in other compositions either before or after application of a preservative composition as described herein.

As will be appreciated, the non-perishable, plant derived food items of the invention may be further enhanced by the addition of one or more desired coloring, flavoring, and/or scenting agents to a formulation used to apply a coating during the processing of the food item in accordance with the invention. Such additives result in food items that have improved durability, appearance, visual esthetics, scent, and flavor, as compared to products that do not include such additives. Preferred flavor agents, or "flavorings", include food-grade essential oils, representative examples of which include berry oils (e.g., a strawberry oil, a raspberry oil, etc.), anise oil, cedar oil, chamomile oil, cinnamon oil, clove oil, coconut oil, sage oil, basil oil, bergamot oil, citrus oils (e.g., a lemon oil, an orange oil, etc.), prunus oil, and melon oils, although any food-grade flavoring, or combination of flavoring agents, may be employed, depending on the desired flavor of the finished non-perishable plant-derived food item. See, e.g., Food Technology (August 2005), vol. 59, no. 8, article entitled "GRAS Flavoring Substances 22") and U.S. FDA's "Food Additive Status List" (www.cfsan.fda.gov/~dms/opa-appa.html) for a partial listing of flavor agents.

Indeed, the non-perishable food items of the invention can be visually enhanced by the addition of one or more edible or non-edible decorative components. A "decorative component" refers to any material, or combination of materials, that has a decorative aspect and which can be applied to a food item of the invention at some stage during processing. Such components include gems (e.g., precious, semi-precious, or synthetic gems (e.g., diamonds, rubies, sapphires, pearls, etc.) in powder, chip, flake, or stone form), minerals (e.g., precious or semi-precious minerals in powder or flake form), metals (e.g., precious or semi precious metals (e.g., gold, silver, and platinum, copper, etc.) in powder or flake form), iridescent colorings, food colorings, food dyes, non-food dyes, all forms of chocolate or cocoa enhancement (chocolate coating, cocoa mass, cocoa butter mixtures) and other edible and non-edible forms of visual enhancement. As will be appreciated, some additives, for example, chocolate, may serve as both a decorative components and a flavor enhancer.

A "coating" refers to layer of material applied to a surface for some intended purpose. Typically, a coating is applied as a liquid formulation that then dries and leaves a solid layer on the surface that was coated. The thickness of a coating will vary, depending on many factors, including the chemical composition of the coating, the process used to deliver the coating, etc. Coatings, once dry, will also have a desired finished appearance. For example, a coating may dry clear, meaning that it is transparent. Alternatively, when dry a coating may be translucent, opaque, or colored, or some combination of these. Exemplary coatings used in the practice of the invention result from application of a preservative composition, a formulation containing a strengthening component, and a finish coating.

In the context of this invention, a "coating" is a film, preferably an edible film, formed from a polymer. Edible films are formed from food-grade polymers. Thus, any suitable food-grade polymer may be adapted for use in the practice of this invention. Coatings can be applied by any suitable technique, including dipping and spraying, to form a continuous barrier as the film adheres to the surface to which it is applied, be it plant material or another coating already applied to the plant material. Preferably, a coating, particularly the coating formed from the preservative composition (i.e., the "preservative" or "preservative coating") will provide a barrier having limited, preferably extremely low, water-solubility, so as to prevent water from penetrating the barrier and reaching the plant material. Polymers that form films can be composed of carbohydrates, protein, solid lipids/waxes, or resins. Examples of carbohydrate polymers include various forms of cellulose, such as carboxymethylcellulose (CMC) and hydroxypropyl cellulose (HPC); starch and dextrins; pectin; and alginates. Proteins suited for this purpose include albumen, corn zein, soy protein isolate, collagen, whey, and egg white proteins. Waxes include beeswax and carnuba Wax, while shellac is the only food-grade resin, and shellac is particularly preferred for forming the outer, and preferably the final, coating on the non-perishable food items of the invention. Combinations of these materials can also be used.

Shellac is one of the oldest substances collected for the purpose of coating and adhesion, and holds its gloss even in conditions of high humidity. As such, it serves as an effective moisture barrier. The shellac resin is secreted by a female, mite-sized beetle to hold its eggs to the bark of a tree cultivated for this purpose. After shellac is harvested from the trees, it is formulated into a product commonly referred to as "confectioners glaze." Confectioners glaze is commonly used to provide a very durable, hard, glossy finish on candy. It is available commercially from a number of vendors (e.g., Crystalac® from Mantrose-Haeuser Co., Inc., Westport, Conn.; Temuss Products Canada Ltd., Ajax, Ontario, Canada), and can be prepared by following the manufacture's instructions.

As will be appreciated, "drying" refers to any method that works to remove the liquid portion of a solution. For example, in the context of food preservation, removing water helps to prevent decay and the growth of microorganisms. Water and other liquids and solvents are usually removed by evaporation, and techniques such as air-drying (with or without low heat), sun drying, smoking, and wind-drying can be used for this purpose. Other drying techniques include freeze-drying, wherein an article (e.g., a plant-derived material such as a flower) is first frozen (preferably flash frozen) and then water is removed by sublimation. What constitutes "dry" will also depend on the particular coating. Some coating dry to yield a hard surface, while others may, for example, have a sticky or tacky feel. In the context of this invention, coating that are hard when dry are preferred. In some embodiments, drying is achieved at a temperature range of from about 55 to about 105 degrees Fahrenheit (F.), preferably in a temperature range of between about 65 F. and 95 F., and more preferably, in a temperature range of between about 75 F. to about 85 F. Also, drying processes are preferably performed in a low humidity (i.e., less than about 80%, preferably less than about 50%, humidity) or controlled humidity environment. In some embodiments, a drying process takes place in a well-ventilated area, and more preferably, in a well-ventilated area that has gentle airflow or air convection circulation. Indeed, in particularly preferred embodiments, the drying process takes place in a well-ventilated area that has gentle airflow or air convection circulation, wherein air is heated to about 75 F. to about 85 F. and contains a low, controlled amount of humidity.

After the preservative composition has been prepared, it can be applied to the plant-derived material using any suitable technique, including by spraying, immersing, and painting, or combinations thereof. The length of time the plant-derived material is contacted with the preservative composition will depend on a variety of factors, including the size and type of plant material to be treated, its intended application, the particular preservative composition, its methods of application to the material, etc. That said, it has been found that such contacting should occur for fewer than about 4-8 hours, preferably for less than 2 hours. Indeed, exposure times of less than an hour, preferably less than 30 minutes, more preferably less than 15 minutes, and most preferably, less than 10 minutes, frequently work well, especially for materials such as flowers and flower petals.

In preferred embodiments, after a preservative composition has been applied to the planted-derived material, excess solution is removed using any suitable method. Such methods preferably are gentle so that they do not damage the plant material or remove more preservative composition than necessary. Such processes include blotting, gentle shaking, low speed centrifugation, placement in a dehumidified environment, or any other process that may be suitable adapted for removal of excess preservative composition without damage to the plant-derived material coated with the preservative composition.

After a preservative composition has contacted the plant-derived material for a desired period of time, a composition comprising a strengthening component is applied to at least the lower surface of the material. A "strengthening component" refers to a chemical, or chemical composition, that serves to add structural support to a plant-derived material (e.g., a flower petal). When applied to only the underside of, for example, a flower, it is not necessary for the composition comprising the strengthening component, once dry, produce a transparent, clear coating, although strengthening component formulations that, upon drying, result in a clear coating are preferred. A particularly preferred strengthening component is a sugar, such as a granulated or crystalline form of a sugar such as glucose. In particularly preferred embodiments that employ a granulated or crystalline form of glucose, the sugar is coated onto the underside of a flower or flower petal while the preservative composition is still wet. In these embodiments, any method suitable for applying a uniform coating of granulated or crystalline sugar can be used.

In processing plant-derived material in accordance with the invention, the material is typically placed on a tray or grid that allows it to be processed with minimal handling. Devices that have two grids joined to each other along one edge by a hinge that allows the grids to be moved in relation to each other are particularly useful to holding and processing plant-derived material. For example, a number of flowers may be laid out such that the grids, when brought into closed, spaced relation, gently secure the flowers to prevent their movement within the device but allow the upper and lower surfaces of the flowers to be easily accessed for application of the various coatings used in the practice of this invention.

Before, after, or simultaneously with the application of a strengthening component to the underside, or lower surface, of a plant-derived material, particularly a flower, at least one finish coat is applied to at least the upper surface of the material, which coat (or coats) may referred to herein as a "specialty coating". In some embodiments, a finish coat is applied after the preservative composition has dried, although such a coating, like the coating used to supply the strengthening component to at least the underside of the material, may also be applied before the preservative composition has dried. If desired, the finish coating may also be applied to the lower surface of the plant-derived material, preferably after the coating containing the strengthening component has also dried. In preferred embodiments, the finish coating also comprises a sugar, for example, glucose or sucrose. Here, and elsewhere in this specification, "sugar" is defined broadly to mean any natural or artificial sweetener or derivative thereof that is suitable for human consumption and which can be made into a sugar solution, confectionary glaze, food grade confectionary lacquer, food grade confectionary shellac, powder (powdered or confectionary sugar), flakes, crystals, or granule form. A particularly preferred hard, clear coating can be produced using an isomalt-containing solution (as described in the Examples, below), followed by the application of a food-grade preservative (i.e., a preservative safe for use in food) in the form of a confectionary glaze, lacquer, or shellac, to at least the upper surface of the plant material. If decorative components have been applied to, for example, the edges of flower petals or been broadcast over the upper surface of one or more flower petals, such a coating also will serve to hold the decorative components in place, as well as act as a specialty coating.

In some embodiments that involve the application of multiple finish coats to at least an upper surface of the plant material, a second sugar coating comprised of visible sugar granules is applied to at least a portion of the upper surface of the material while the first such finish coat has yet to dry, although it is sufficiently dry such that at least some of the visible sugar granules broadcast onto the drying first finish coat layer do not appreciably dissolve. Instead, they retain their granular nature so as to provide an appearance of embedded crystals on the upper surface of the plant material.

Following application of the finish coat (whether applied as a single coat or as multiple coats), a protective outer layer may be applied to the upper, and if desired, the lower surface of the plant-derived material. Such a protective layer, if applied, preferably provides a clear, shiny, lacquered appearance to the surface(s). Moreover, it is preferred that such a protective coating comprise a solution wherein the solvent is water or a distilled spirit, beer, or wine, or a mixture of water and another alcohol-containing solution.

Preferably, plant material treated in accordance with the methods of this invention substantially retains its original shape and color, and appears for all intents and purposes to be a candied flower, the difference being that such plant material is non-perishable. Indeed, such material will not materially deteriorate if held longer than at least about 10, 20, 30, 40, 50, 60, 70, 80, 90, 100, 150, 180, 210, 240, 270, 300, 330, 360, or more days under normal shipping and storage conditions for candied varieties of flowers and fruit produced by conventional methods. For clarity, in the context of this invention, "perishable" means that the particular item has not been heat-treated, frozen, or otherwise treated so as to prevent the quality of the food or other item from materially deteriorating if held longer than 7 days under normal shipping and storage conditions. Thus, a "non-perishable" plant-derived material (e.g., flowers, flower petals, leaves, etc.) refers to plant-derived material that has been treated with a process according to the invention and does not materially deteriorate if held longer than about 7 days under normal shipping and storage conditions. In this context, "material deterioration" and the like refer to a level of deterioration that does adversely affect the marketability of the particular article, and "normal shipping and storage conditions" refer to those range of conditions under which fresh produce is processed, packaged, shipped, and stored, from harvesting through sale to an end-user.

A related aspect of the invention concerns kits that contain one or more patentable non-perishable, plant-derived food items according to the invention packaged in a container, i.e., any structure suitable for storage of one or more non-perishable, plant-derived food items according to the invention. Representative containers include plastic bags and boxes, envelopes, and the like in which the articles (e.g., edible, non-perishable flowers) can be placed for storage, shipment, display, and sale. Preferably, containers may be closed or sealed. Sealed containers refer to those wherein the interior environment of the container does not exchange with the environment outside of the container, after the container is sealed. The "interior environment" of a container refers to the environment inside, or within the interior of, a container. This environment includes the chemicals in the atmosphere inside of the container, the humidity level of the atmosphere, etc.

Figure 20:
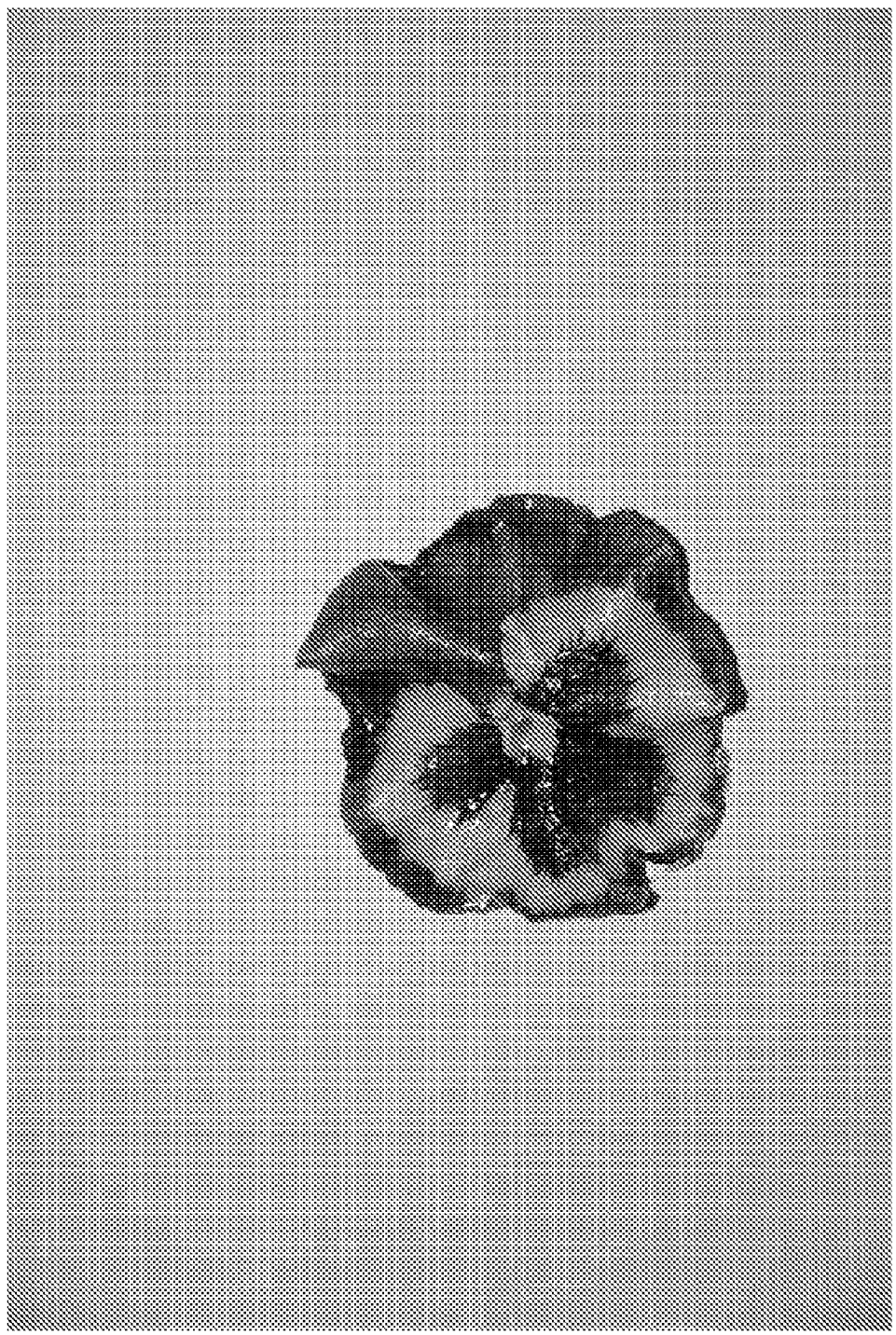
FIGS. 20 and 21 each show a top view of a non-perishable pansy produced using a method according to the invention. As can clearly be seen, the upper surface of this has a high very sheen, allowing it to reflect a substantial amount of incident light.
Figure 21:
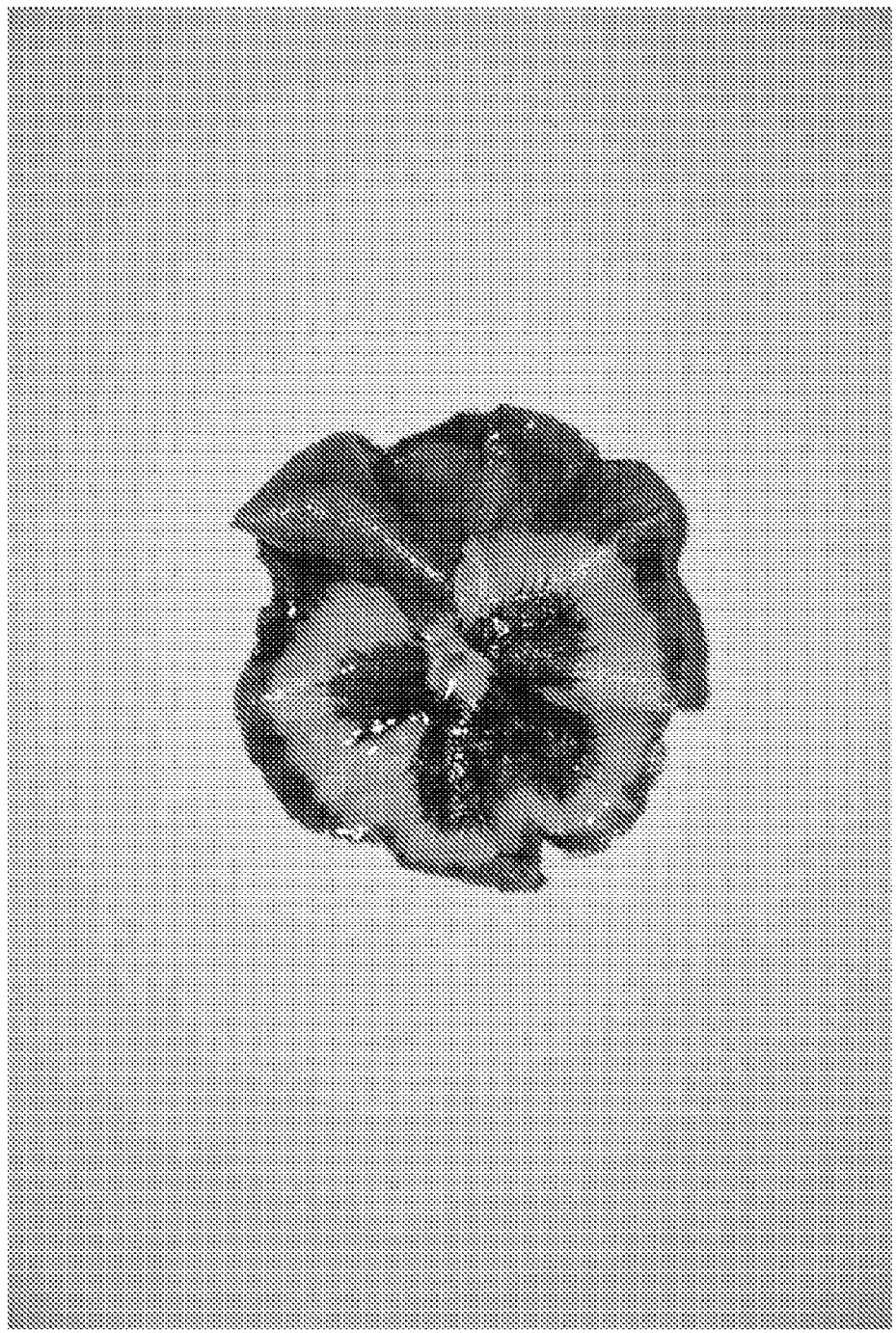
Figure 22:
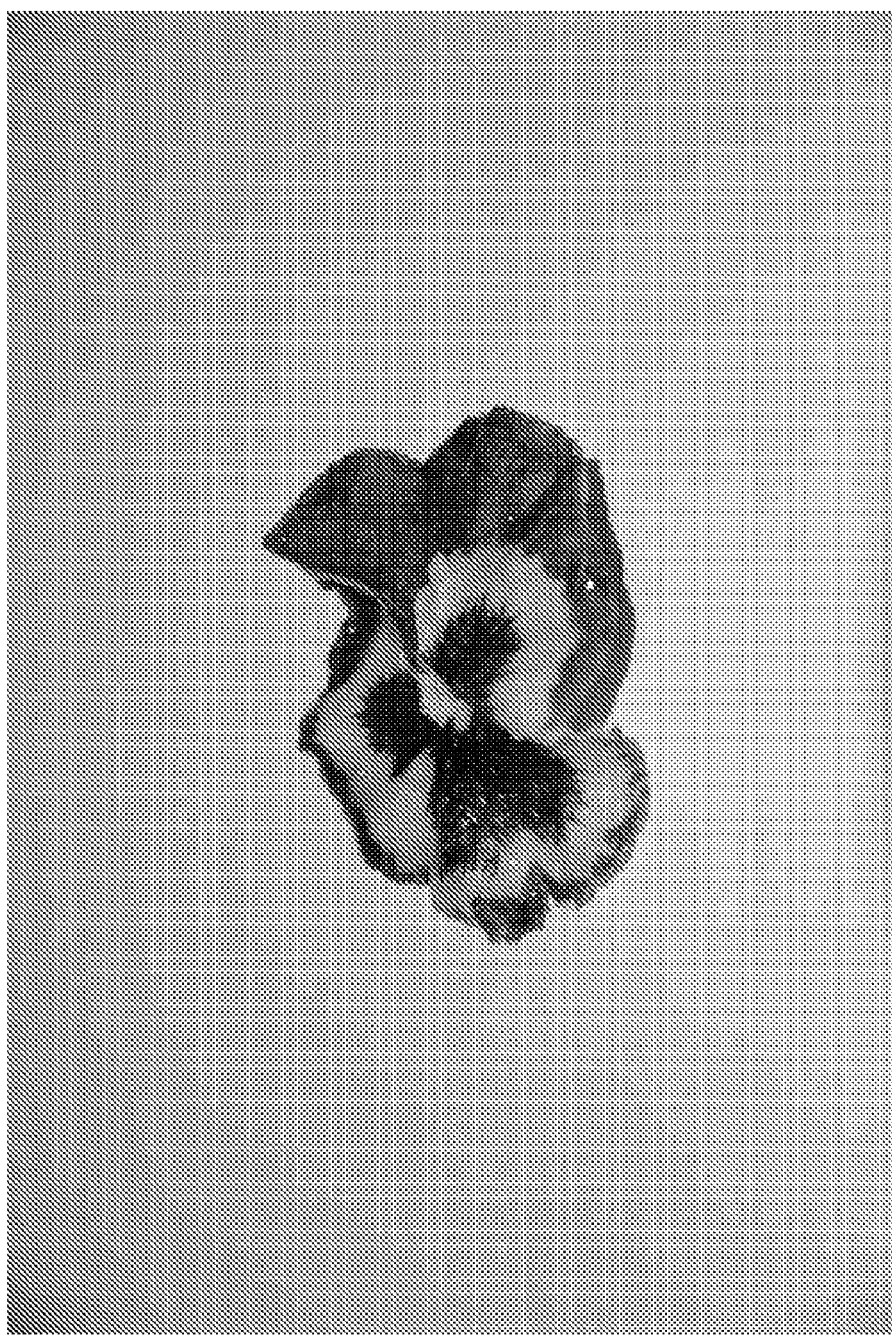
FIG. 22 shows a perspective view of the non-perishable pansy shown in FIGS. 20 and 21.
Figure 23:
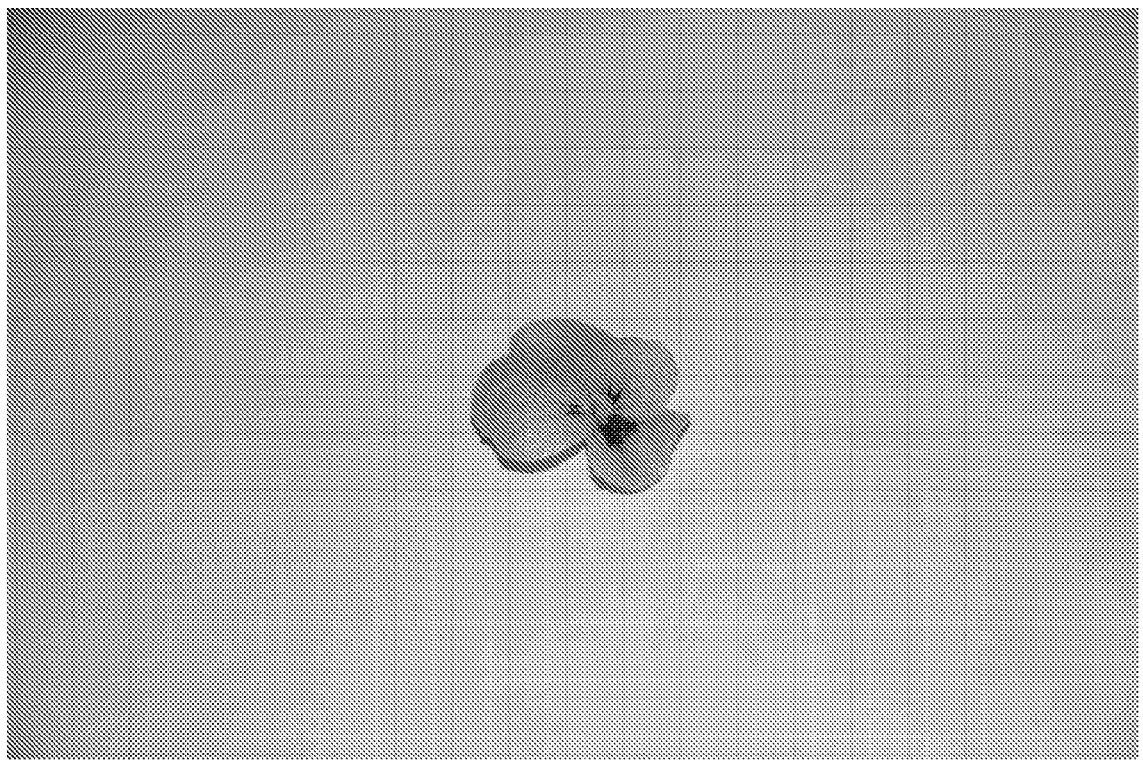
FIGS. 23 and 24 each show a top view of a non-perishable flower produced using a method according to the invention.
Figure 24:
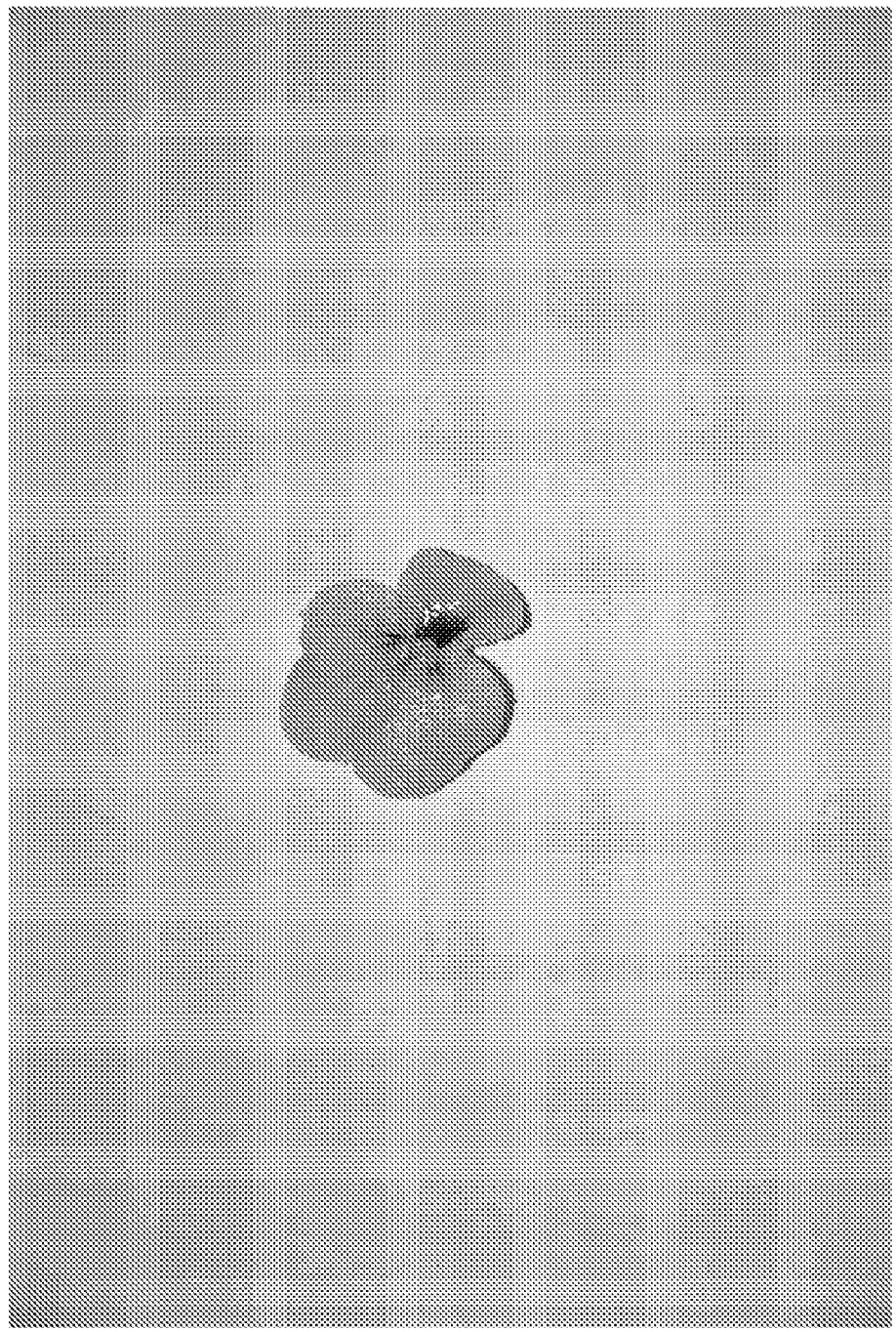
Figure 25:
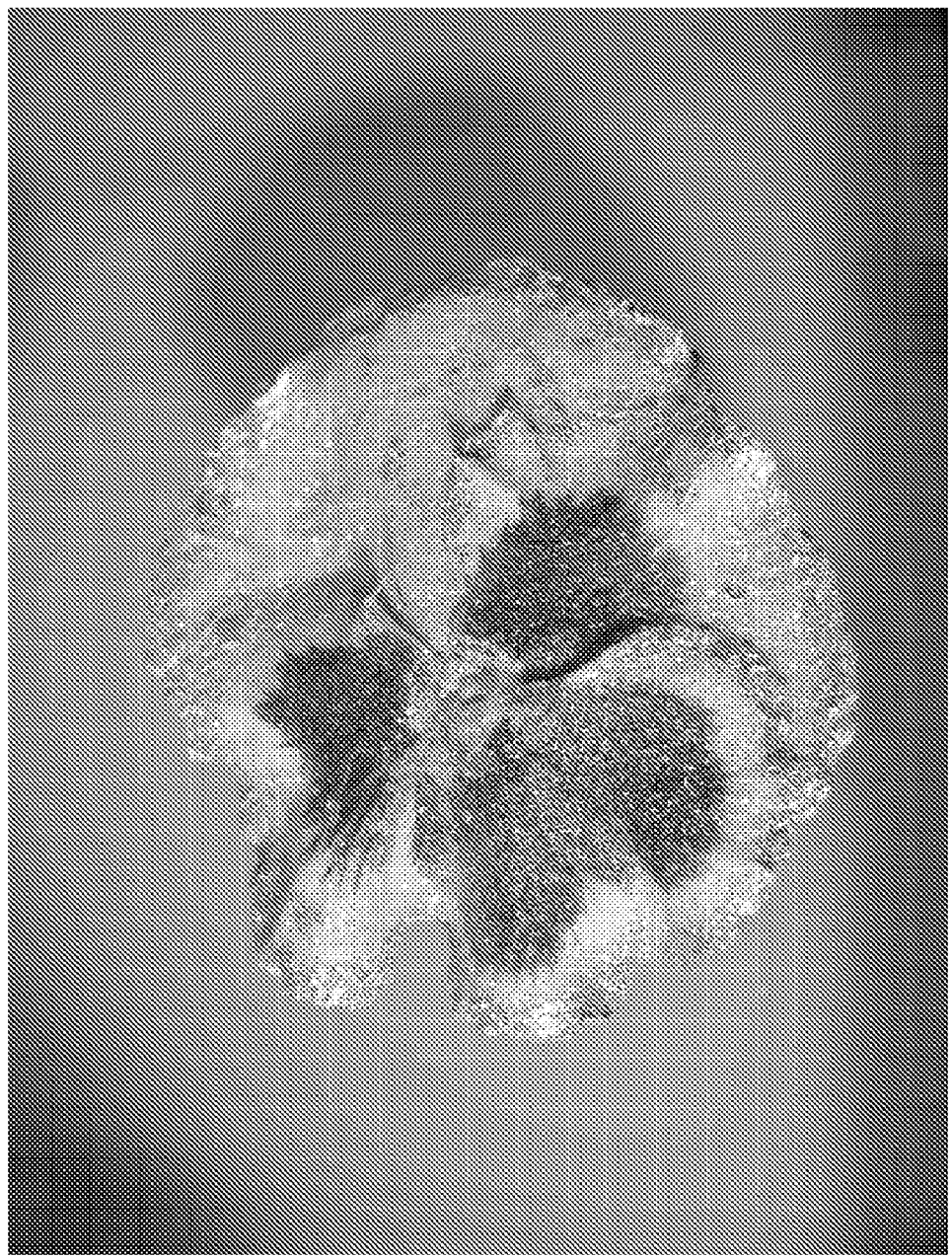
FIGS. 25 and 26 each show a top view of a different non-perishable pansy according to the invention that includes a gold-colored band painted on the outer edge of the upper surface of each of the flower's petals.
Figure 26:
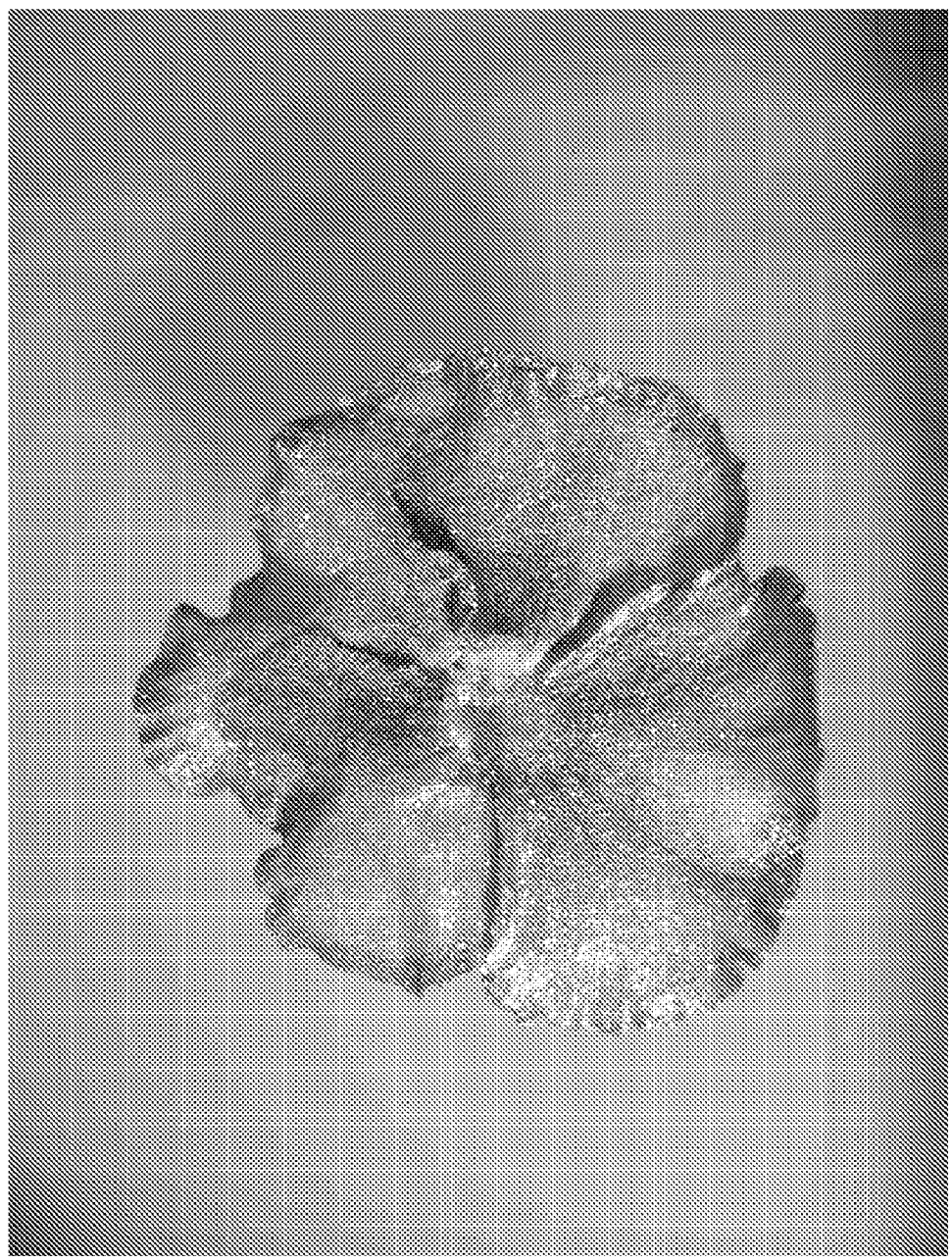
Figure 27:
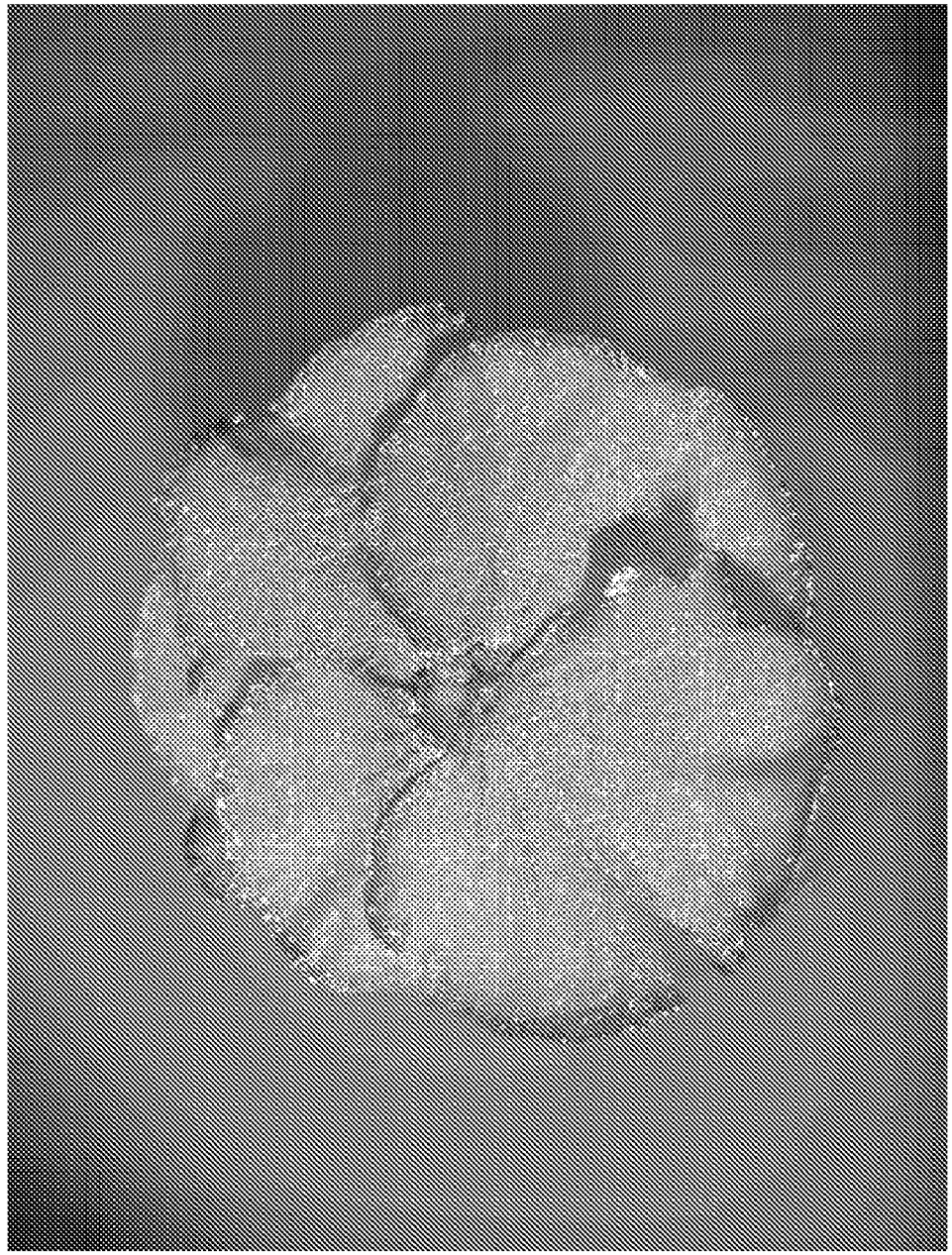
FIG. 27 shows a top view of a non-perishable pansy according to the invention that includes a silver-colored band painted on the outer edge of the upper surface of each of the flower's petals.

In some embodiments, food items according to the invention may be packaged in a manner that enhances their aesthetic features. For example, a flower as shown in any of FIGS. 20-27 may be placed in a container, such as a clear plastic box or other box having a having a lid and body so that that the painted, high sheen petals are readily visible to prospective purchasers. If desired, the bottom of the box, or added material (e.g., a food-compatible padding material) on which one or more non-perishable, plant-derived food items may be placed, may be covered with a colored coating that contrasts with, and thus enhances, the processed food item, such as a flower. As will be appreciated, to prevent articles from moving or sliding about in their container during storage and transport, any suitable material may be employed. Other items may also be included in a kit according to the invention, including directions for storage of the articles, recipes, etc.

EXAMPLES

The following examples are provided to illustrate certain aspects of the present invention and to aid those of skill in the art in practicing the invention. These examples are in no way to be considered to limit the scope of the invention in any manner.

The examples that follow describe a preferred set of compositions and processes to produce edible, non-perishable flowers. The flowers used in these examples were fresh, hothouse grown pansies. Section A-D describe the various solutions used in processing the flowers, and sections E and F describe actual processes that were, or could be, carried out.

A. Preservative Compositions and Formulations.

As described above, a preservative composition according to the invention serves to remove waxes, oils, and fats from the surface of plant-derived materials such as flowers. Such a solution also aids in dehydration of the plant material. The components of the preservative solution used in this example included an edible protein composition, namely reconstituted pasteurized egg white protein that, when combined with sugar or with other sugar-containing compositions, for example, a strengthening component, and dried, make a hardened, sweet outer protective shell around the dehydrated plant material. Specifically, the preservative compositions used in this example included one (1) tablespoon of either meringue powder (either commercially obtained or homemade) or powdered egg whites and 1-2 ounces of vodka. These components were combined in a measuring cup, after which water was added to bring the total volume of the solution to one (1) cup. As will be appreciated, this formulation can be scaled to any size, as long as the proportions are maintained. Experience with formulations made using a commercially prepared or homemade meringue powder versus reconstituted pasteurized egg white protein revealed that the meringue-containing formulations resulted in a more flavorful product.

Several variations of the water-alcohol-meringue/egg white preservative compositions were also prepared, in which a flavoring and/or scenting agent was also included in the solution prior to application to the flowers. Specifically, the flavoring and/or scenting agents were added to the solution in either dry or liquid form prior to adding enough water to bring the final volume to 1 cup, or some multiple thereof. As flavoring and scenting agents come in many formulations, one skilled in the art will know which agent(s) to add to obtain the desired taste and/or fragrance, as the case may be. One skilled in the art will also recognize that replacing vodka with other distilled spirits safe for human consumption will result in alternative commercially desirable fragrance and taste components.

B. The Aqueous Sugar Wetting/Coating Solution

A water-based sugar-containing solution was prepared for in controlling the drying time of the plant material. As will be appreciated, wetting the plant material so as to control the drying/dehydration process allows one to produce a non-perishable, plant-derived food item that is dried uniformly and which retains its original shape and appearance. Additionally, such a solution can be used to apply one or more of the sugar coatings to the upper surface of the plant material. If two such coatings are applied, one after another, the latter of the two layers to be applied becomes a hardened, shiny coating on the surface to which it is applied, for example, the upper surface of a flower. Such a coating provides a high sheen, visible after drying, allowing the flower to take on a shiny, lacquered appearance.

A representative example of such a water-based, sugar-containing wetting solution was made by adding four (4) cups of granulated sugar to four (4) cups of water. This solution was then brought to a boil, after which it was allowed to cool. After cooling, the solution was poured into a clean, hand-held pump action spray bottle. This solution, too, can be scaled to any size, using the same as above.

A variation on this a water-based, sugar-containing wetting solution can also be made by adding flavoring and/or scenting components. The flavoring and/or scenting components can be added in either dry or liquid form, either before boiling (in the case of powders) or after the solution has been cooled (in the case of flavoring or scenting oils, so as to not evaporate or alter the flavoring and/or scenting component). As flavoring and/or scenting agents or components come in many formulations, one skilled in the art will know to add the flavoring and/or scenting agents or components to obtain the desired taste or fragrance, as the case may be.

C. Final Coating Solution.

As already described, a final clear, hard coating may be desired to help act as a preservative and, in embodiments where decorative components have been added, to help hold the those components in place. A recipe for a representative final coating solution of the water-based, sugar-containing variety is described below. In this coating, the sugar of choice was ISOMALT®, a low-calorie, sucrose-based sugar replacement made from sugar beet that is naturally as sweet as sugar and has low hygroscopicity. ISOMALT® is an equimolecular mixture of glucosido-1-6-mannitol and isomaltitol, obtained by hydrogenation of isomaltulose originating from an enzymatic conversion of sucrose. See, e.g., U.S. Pat. Nos. 4,117,173, 4,980,189, and 5,314,701; Hammond and Hudson (June 1989), Leatherhead Food R. A. report no. 652, no. 11).

D. Final Coating Solution.

The final solution used to coat the flowers processed in this example was prepared by adding 25 grams of water to 250 grams of ISOMALT® placed in a pan. The isomalt was allowed to absorb the water for about roughly 2 minutes. The isomalt suspension was then heated to a temperature in the range of about approximately 250 to 350 degrees Fahrenheit (F), until all the isomalt was completely melted. The solution was then cooled to approximately 200 degrees F., at which point it was ready for use. As will be appreciated, this recipe can also be scaled to any desired size, provided that the proportions of the components are maintained, and non-volatile scenting agents or flavoring agents may also be added during the preparation of this solution, if desired. The flavoring and/or scenting components may be added in either dry or liquid form, either before boiling (in the case of powders, preferably) or after the sugar solution has been cooled (in the case of flavoring or scenting oils, so as to not evaporate or alter the flavoring/scenting component). As flavoring and/or scenting agents or components come in many formulations, one skilled in the art would know to add the flavoring and/or scenting agents/components to obtain the desired taste or fragrance E. Flower Processing.

Several pansy flowers were processed using the solutions above in accordance with the following procedure.

The flowers were immersed in an amount of the preservative solution sufficient for all of the surfaces of the flower to be wetted. The flowers remained immersed in the preservative solution with gentle agitation. After 10 minutes, the flowers were removed from the preservative solution and placed in a lettuce spinner. The material was then subjected to gentle, manual, slow speed centrifugation to remove excess preservative solution from the flowers. Next, the flowers were placed on a grid/tray, with the underside of the flowers (i.e., their lower surfaces) facing up. The lower surfaces were sprinkled with a sufficient quantity of granulated sugar to achieve a thick coating of sugar, with the sugar acting as a strengthening component. As will be appreciated, sugar may be applied using any method or device that would allow a uniform and thick coating of granulated sugar to be layered onto the flowers. The use of granulated sugar is important as it acts as a strengthening component to the underside of the plant material.

A second grid/tray was then placed over the sugar-coated flowers, and the grids/trays, with the flowers located in between, were turned over to expose the flowers' upper surface. If necessary, the upper grid/tray was removed if it could impede the addition of the sugar coating to the upper surface of the flowers. If at this stage any liquid or moisture was visible on the upper surface of the flowers, powdered or granulated sugar was then sprinkled thereon to absorb the remaining moisture. Alternatively, if a shiny lacquered finish was desired, the aqueous coating solution was sprayed on the flowers' upper surface. If the upper surface of the flowers appeared dry or had no visible moisture prior to the application of the aqueous coating solution, the wetting solution was used to wet the flowers' upper surfaces to allow a coating of powdered or granulated sugar to be added. Alternatively, the wetting solution was used as the first sugar coating on the upper surface. A second layer of sugar coating was then applied. In this process, this second sugar coating layer dictated the final appearance of the upper surface of the flowers. If granulated sugar was applied, then the final product retained some of the crystalline appearance imparted by the granulated sugar, at least some of which did not dissolve. As a result, the upper surface of the flowers so treated resembled diamond-coated flowers. On the other hand, the addition of powdered sugar resulted in a snowy, sugary appearance, while liquid sugar gave a shiny lacquered appearance.

After applying the sugar coating in one or more layers, the flowers were allowed to dry in a low humidity environment, with gentle airflow, and temperature between 75 to 85 F. for three to four days. A final coating was then applied by spraying a confectioners glaze solution (Crystalac®, Mantrose-Haeuser Co., Inc., Westport, CT' prepared per the manufacturer's instructions) onto the flowers to complete coat them. After the shellac-containing coating was allowed to completely dry, the processed flowers were then transferred to sealed containers that were substantially air tight and dry for storage.

Prior to the addition of the final shellac-containing coating, additional decorative elements were added to several of the non-perishable flowers otherwise prepared as described above. Here, before the processed flowers were coated with confectioners glaze, one or more edible decorative components were added to the upper surfaces of these flowers. For example, edible decorative items such as a food coloring, crystalline sugar, or cocoa mass, cocoa butter, or chocolate were placed on the upper surface of the plant material. Alternatively, or in addition, non-edible decorative components can also be added to plant material that has been rendered non-perishable through application of one of the processes of the invention. Non-edible decorative items include items such as gems, minerals, metals, and the like, and they are preferably placed on the upper surface of the plant material so as to maximize their visual impact. As with edible decorative items, the non-edible decorative items may be held in place with either a sugar solution (such as a solution containing isomalt or another type of sugar) or a food grade confectionary glaze, lacquer, or shellac.

To secure the decorative items in position, a water-based, sugar-containing solution (e.g., one containing isomalt or another sugar) or, preferably, a food-grade confectionary glaze, lacquer, or shellac was applied to the upper surfaces of the flowers.

Although the invention has been described with reference to the above examples, it will be understood that modifications and variations are encompassed within the spirit and scope of the invention. Accordingly, the invention is limited only by the appended claims.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the spirit and scope of the invention as defined by the appended claims.

All patents, patent applications, and publications mentioned in the specification are indicative of the levels of those of ordinary skill in the art to which the invention pertains. All patents, patent applications, and publications, including those to which priority or another benefit is claimed, are herein incorporated by reference in their entirety to the same extent as if each individual publication was specifically and individually indicated to be incorporated by reference.

The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. A method for treating flower and flower petals to produce a dried non-perishable edible decorative flower or flower petal that substantially retains its original appearance as before treatment, comprising:
   a. by immersion, spraying, or by a combination of immersion and spraying, coating a fresh flower or flower petal with a preservative composition, wherein the flower or flower petal comprises an upper surface and a lower surface and wherein the preservative composition comprises:
      i. an aqueous solvent comprising water and from about 0.01% to at least about 50% alcohol on a volumetric basis; and
      ii. a binding agent that comprises egg white protein;
   b. adding a strengthening component to at least the lower surface of the preservative-coated flower or flower petal wherein the strengthening component is added while the preservative composition remains liquid;
   c. after the preservative composition dries, spray-applying a sugar coating to at least the upper surface of the flower or flower petal; and
   d. drying the flower or flower petal, thereby producing a dried non-perishable edible decorative flower or flower petal that substantially retains the same appearance as before treatment.

2. A method according to claim 1, wherein the alcohol is a distilled spirit.

3. A method according to claim 2, wherein the distilled spirit is selected from the group consisting of beer, wine, champagne, vodka, gin, scotch, whiskey, bourbon, cognac, brandy, rum, and grain alcohol.

4. A method according to claim 1, wherein the egg white protein is included in a meringue composition that comprises powdered egg whites, corn starch, vanilla, sugar, calcium sulfate, citric acid, cream of tartar, gum arabic, and silicon dioxide.

5. A method according to claim 1, wherein the strengthening component is a sugar.

6. A method according to claim 1, further comprising adding at least one decorative component to at least the upper surface of the flower or flower petal after the flower or flower petal is substantially dry.

7. A method according to claim 6, wherein at least one decorative component is applied using a food grade confectionary lacquer, shellac, or an isomalt sugar solution that includes the decorative component(s).

8. A method according to claim 6, wherein the decorative component, is selected from the group consisting of a gem, a mineral, a metal, an iridescent coloring, a food coloring, a food dye, a non-food dye, and a form of chocolate.

9. A non-perishable, edible decorative flower or flower petal produced in accordance with the method according to claim 1.

10. A kit comprising a non-perishable edible decorative flower or flower petal, according to claim 9 packaged in a container.

* * * * *